US009971667B1

(12) United States Patent
Jenkins et al.

(10) Patent No.: US 9,971,667 B1
(45) Date of Patent: May 15, 2018

(54) EQUIPMENT SOUND MONITORING SYSTEM AND METHOD

(71) Applicant: Discovery Sound Technology, LLC, Nashville, TN (US)

(72) Inventors: John Jenkins, Nashville, TN (US); Howard Samson, Nashville, TN (US); Mike Stumpf, Nashville, TN (US)

(73) Assignee: Discovery Sound Technology, LLC, Nashville, TN (US)

( * ) Notice: Subject to any disclaimer, the term of this patent is extended or adjusted under 35 U.S.C. 154(b) by 359 days.

(21) Appl. No.: 14/918,201

(22) Filed: Oct. 20, 2015

Related U.S. Application Data

(63) Continuation-in-part of application No. 13/690,912, filed on Nov. 30, 2012, now Pat. No. 9,223,299.
(Continued)

(51) Int. Cl.
 *G06F 17/00* (2006.01)
 *G06F 11/30* (2006.01)
 *G01M 13/02* (2006.01)

(52) U.S. Cl.
 CPC ....... *G06F 11/3089* (2013.01); *G01M 13/028* (2013.01); *G06F 11/3058* (2013.01); *G06F 11/3072* (2013.01)

(58) Field of Classification Search
 CPC .. G06F 11/07; G06F 11/0751; G06F 11/3058; G06F 11/3072; G06F 11/3089;
(Continued)

(56) References Cited

U.S. PATENT DOCUMENTS

| 4,287,581 A | 9/1981 | Neale, Sr. |
| 4,658,245 A | 4/1987 | Dye et al. |

(Continued)

FOREIGN PATENT DOCUMENTS

WO  2012088707 A1  7/2012

OTHER PUBLICATIONS

European Patent Office: Extended European Search Report re: Application No. 13858103.8, dated Jul. 5, 2016.
(Continued)

*Primary Examiner* — Andrew C Flanders
(74) *Attorney, Agent, or Firm* — Patterson Intellectual Property Law, P.C.; Gary L. Montle

(57) ABSTRACT

A system and method is provided for local collection of sound data from industrial equipment and comparative analysis of the data. A sound detection device includes transducers resiliently mounted to continuously collect sound signals perpendicular to the electromechanical device. A shrouding material situated between the transducers and the electromechanical device dampens physical vibration to the transducers to peak amplitude of $\leq 0.3$ microvolts, and returns the transducers to a zero-degree angle of reference from a mounting position of the sound detection device by means of elastic retention. Digital sound data is transmitted to a remote server, which analyzes the data wherein comparative models of baseline data are associated with an operative status of the electromechanical device. Variations between the collected data and the baseline data may be associated with failure or substandard operation of the electromechanical device, wherein alerts are accordingly generated to notify a respective client user.

20 Claims, 6 Drawing Sheets

Related U.S. Application Data

(60) Provisional application No. 62/065,980, filed on Oct. 20, 2014.

(58) Field of Classification Search
CPC .... G01M 1/22; G01M 13/028; G01M 13/045; H04R 29/00
See application file for complete search history.

(56) References Cited

U.S. PATENT DOCUMENTS

| | | | |
|---|---|---|---|
| 4,987,769 A | 1/1991 | Peacock et al. | |
| 5,103,675 A | 4/1992 | Komninos | |
| 5,432,755 A | 7/1995 | Komninos | |
| 5,436,556 A | 7/1995 | Komninos | |
| 5,445,026 A | 8/1995 | Eagan | |
| 5,710,377 A | 1/1998 | Youngquist et al. | |
| 5,854,422 A | 12/1998 | McKeon et al. | |
| 5,955,670 A | 9/1999 | Goodman et al. | |
| 6,057,959 A | 5/2000 | Taylor et al. | |
| 6,058,076 A | 5/2000 | Komninos | |
| 6,079,275 A | 6/2000 | Komninos | |
| 6,163,504 A | 12/2000 | Komninos et al. | |
| 6,175,934 B1 | 1/2001 | Hershey et al. | |
| 6,220,098 B1 | 4/2001 | Johnson et al. | |
| 6,247,353 B1 | 6/2001 | Battenburg et al. | |
| 6,295,510 B1 | 9/2001 | Discenzo | |
| 6,301,514 B1 | 10/2001 | Canada et al. | |
| 6,658,373 B2 | 12/2003 | Rossi et al. | |
| 6,666,093 B2 | 12/2003 | Morganti | |
| 6,701,725 B2 | 3/2004 | Rossi et al. | |
| 6,766,692 B1 | 7/2004 | Eagan | |
| 6,775,576 B2 | 8/2004 | Spriggs et al. | |
| 6,782,345 B1* | 8/2004 | Siegel | G06F 11/0733 399/18 |
| 6,809,642 B1 | 10/2004 | Brenner | |
| 6,923,063 B2 | 8/2005 | Komninos | |
| 6,973,793 B2 | 12/2005 | Douglas et al. | |
| 6,978,675 B2 | 12/2005 | Eagan | |
| 7,016,742 B2 | 3/2006 | Jarrell et al. | |
| 7,051,577 B2 | 5/2006 | Komninos | |
| 7,079,967 B2 | 7/2006 | Rossi et al. | |
| 7,099,852 B2 | 8/2006 | Unsworth et al. | |
| 7,308,385 B2 | 12/2007 | Wegerich et al. | |
| 7,540,183 B2 | 6/2009 | Komninos | |
| 7,580,781 B2 | 8/2009 | Mindeman | |
| 7,603,586 B1 | 10/2009 | Skladanowski et al. | |
| 8,024,938 B2 | 9/2011 | Rossi et al. | |
| 8,245,576 B2 | 8/2012 | Komninos | |
| 8,468,874 B2 | 6/2013 | Komninos | |
| 8,495,914 B2 | 7/2013 | Izikoff | |
| 8,872,652 B2 | 10/2014 | Komninos | |
| 8,872,654 B2 | 10/2014 | Komninos | |
| 2002/0152056 A1 | 10/2002 | Herzog et al. | |
| 2004/0102928 A1 | 5/2004 | Cuddihy et al. | |
| 2004/0112136 A1* | 6/2004 | Terry | G01M 13/028 73/572 |
| 2004/0136539 A1* | 7/2004 | Uhi | H04N 1/00002 381/56 |
| 2004/0158474 A1 | 8/2004 | Karschnia et al. | |
| 2005/0096873 A1 | 5/2005 | Klein | |
| 2005/0126264 A1 | 6/2005 | Komninos | |
| 2006/0053867 A1 | 3/2006 | Stumpf | |
| 2006/0135907 A1 | 6/2006 | Remde et al. | |
| 2006/0164097 A1 | 7/2006 | Zhou et al. | |
| 2006/0265261 A1 | 11/2006 | Wetzer et al. | |
| 2007/0028693 A1 | 2/2007 | Komninos | |
| 2007/0109137 A1 | 5/2007 | Farrell | |
| 2007/0109138 A1 | 5/2007 | Farrell | |
| 2007/0112528 A1 | 5/2007 | Farrell | |
| 2008/0147356 A1 | 6/2008 | Leard et al. | |
| 2009/0091441 A1* | 4/2009 | Schweitzer, III | G01M 13/028 340/531 |
| 2009/0196431 A1 | 8/2009 | Gregg | |
| 2010/0023585 A1 | 1/2010 | Nersu et al. | |
| 2010/0039271 A1 | 2/2010 | Izikoff | |
| 2010/0067708 A1 | 3/2010 | Groth | |
| 2010/0097057 A1 | 4/2010 | Karpen | |
| 2010/0307860 A1 | 12/2010 | Ellingson | |
| 2011/0022346 A1 | 1/2011 | Rossi et al. | |
| 2011/0055669 A1 | 3/2011 | DeHaan et al. | |
| 2011/0074589 A1 | 3/2011 | Han et al. | |
| 2012/0035802 A1 | 2/2012 | Suzuki et al. | |
| 2012/0230482 A1 | 9/2012 | Gavillet | |
| 2013/0046714 A1* | 2/2013 | Harris | G01H 1/00 706/12 |
| 2013/0063262 A1 | 3/2013 | Shaikh et al. | |
| 2013/0283890 A1 | 10/2013 | Komninos | |
| 2014/0114612 A1 | 4/2014 | Yoskovitz et al. | |
| 2016/0100265 A1* | 4/2016 | Maggiore | G01S 3/801 381/56 |
| 2016/0100266 A1* | 4/2016 | Propp | H04R 29/00 381/56 |
| 2016/0302019 A1* | 10/2016 | Smith | G01H 1/00 |

OTHER PUBLICATIONS

Ivan Polajnar et al: Sources of Acoustic Emission in Resistance Spot Welding, Nov. 6, 2008 (Nov. 6, 2008), XP055283415, Retrieved from the Internet: URL:http://citeseerx.ist.psu.edu/viewdoc/download?doi=-10.1.1.216.5231&rep=rep1&type=pdf [retrieved Jun. 24, 2016].

Jemielniak et al: "Catastrophic Tool Failure Detection Based on Acoustic Emission Signal Analysis", CIRP Annals, Elsevier BV, NL, CH, FR, vol. 47, No. 1, Jan. 1, 1998 (Jan. 1, 1998), pp. 31-34, XP022137426, ISSN: 0007-08506 (07) 62779-6.

Anonymous: "Outlier -= Wikipedia, the free encyclopedia", Nov. 8, 2012 (Nov. 8, 2012), XP055283665, Retrieved from the Internet: URL: https://en.wikipedia.org/w/index.php?title=Outlier&oldid=-521929459 [retrieved Jun. 27, 2016].

D. Rajendra et al: "A physically based classification approach for identifying AE source mechanism", Optical Sensing II, vol. 7648, Mar. 25, 2010 (Mar. 25, 2010), p. 76480Y, XP55283442, 1000 20th St. Bellingham WA 98225-6705 USA ISSN: 0277-786X, DOI: 10,.1117/12.847781 ISBN: 978-1-62841-971-9 *abstract*.

N Tandon et al: "The Application of the Sound-Intensity Technique to Defect Detection in Roiling-Element Bearings", Applied Acoustics, Jan. 1, 1990 (Jan. 1, 1990), pp. 207-217, XP55402079, Retrieved from the Internet: URL:http://ac.els-cdn.com/0003682X9090019Q/1-s2.0-0003682X79090019Q-main.pdf?_tid=87d73c40-8cbd-11e7-a5d5-00000aacb35d&acdnat=1504013311_133ffbe3b260c5133178e57112G311c8.

Rutter, Thomas A.: "Acoustic Analysis of Quiet Ball Bearing Failure Modes", Marine Technology, Apr. 1, 1979 (Apr. 1, 1979), pp. 181-188, XP5402240, Retrieved from the Internet: URL:http://www.sname.org/HigherLogic/System/DownloadDocumentFile.ashx?DocumentFileKey-d48eeb1c-6a0a-4083-b 282-aa79ea0f0679 [retrieved on Aug. 30, 2017].

* cited by examiner

EQUIPMENT SOUND MONITORING SYSTEM AND METHOD

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a continuation-in-part of U.S. patent application Ser. No. 13/690,912, filed Nov. 30, 2012, and further claims benefit of U.S. Provisional Patent Application No. 62/065,980, filed Oct. 20, 2014, both of which are hereby incorporated by reference.

BACKGROUND OF THE INVENTION

The present invention relates generally to the field of utilizing ultrasound emissions for fault detection in industrial equipment. More particularly, the present invention relates to a system and method for locally collecting sound data from distributed industrial equipment and remotely and centrally diagnosing the sound data for a wide array of industrial equipment to determine the presence of faults and trends to failure that may be used as the basis for corrective action/preventative maintenance programs.

BRIEF SUMMARY OF THE INVENTION

Systems and methods in accordance with the present disclosure collect at least sound data files from equipment across a number of distributed locations and properties, and leverage the collected data and aggregated variables derived therefrom to perform comparative analysis and recommend corrective action as needed.

In an embodiment of a system as disclosed herein for comparative analysis of sound data obtained from client equipment, a sound detection device with at least one transducer is installable as a permanent or semi-permanent module resiliently mounted within or otherwise in association with the client equipment, to continuously collect sound signals perpendicular to a surface of the client equipment such as an electromechanical device. An elastic shrouding material may preferably be situated between the transducers and the client equipment in order to dampen physical vibration to the transducers to peak amplitude of ≤0.3 microvolts, and further to return the transducers to a zero-degree angle of reference from a mounting position of the sound detection device by means of elastic retention.

In such an embodiment, the sound detection device may further be configured to generate digital sound data files based on the continuously received analog signals, and to transmit each of the data files to a remote server along with, in certain embodiments, location data and electromechanical device type data, via a communications network.

A processor associated with the server may further be configured to determine baseline criteria according to one or more of the electromechanical device type, location, and sound data, wherein a comparative model of baseline data is associated with a respective status of operation of the electromechanical device. The processor further compares the received digital sound data with the baseline data, identifies variations between the collected digital sound data and the baseline data associated with failure or substandard operation of the electromechanical device, and generates an alert effective to notify a user of the failure or substandard operation of the electromechanical device.

In one aspect of such an embodiment, the baseline data is preconfigured in accordance with the electromechanical device type.

In another aspect of such an embodiment, the sound detection device is further configured to collect environmental condition data such as ambient pressure and temperature information, and to transmit the environmental condition data to the server via the communications network. The processor may further be configured to identify an expected point of failure for the electromechanical device, said identification based on one or more of operative performance, threshold violations, trend patterns, and environmental conditions associated with the electromechanical device over a period of time.

In another aspect, the processor may still further be configured to aggregate the digital data files from a plurality of sound detection devices in accordance with the baseline criteria, wherein for example cost-benefit data may be determined from one or more of operative performance, repair cost, threshold violations, trend patterns, and environmental conditions associated with one or more electromechanical devices over a period of time. The cost-benefit data may still further enable the processor to calculate a cost-benefit analysis in relation to the expected cost of maintenance and repair for the electromechanical device over a period of time.

In another aspect, the processor is further configured to generate a user interface which enables authorized users to monitor an operative status of the electromechanical device as determined by the comparison of the digital sound data to the baseline data.

In another aspect, the processor may for example transmit an alert to notify the user of the failure or substandard operation of the electromechanical device via the communications network to an endpoint device associated with an authorized user.

DETAILED DESCRIPTION OF THE INVENTION

Figure 1:
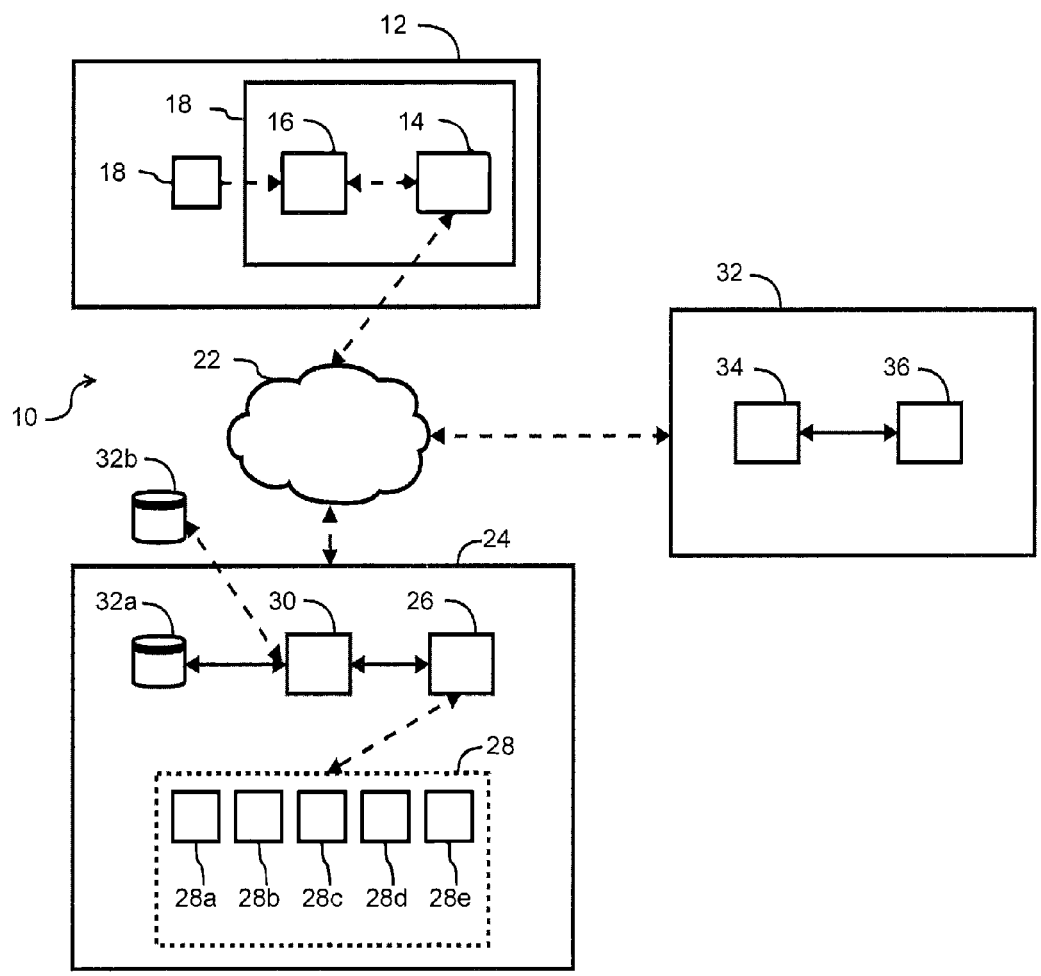
FIG. 1 is a block diagram representing an exemplary embodiment of a system for comparative analysis of sound data according to the present disclosure.

Referring generally to FIGS. 1-5, various exemplary embodiments may be described herein for a system and method for remotely collecting sound data and diagnosing issues in respective industrial equipment. Where the various figures may describe embodiments sharing various common elements and features with other embodiments, similar elements and features are given the same reference numerals and redundant description thereof may be omitted below.

Referring more particularly to FIG. 1, an embodiment of a system 10 according to the present disclosure includes an electromechanical device 12 to which a sound detection device 14 is operatively connected. The sound detection device may comprise a transducer 16 effective to periodically or continuously receive at least analog sound signals from the electromechanical device and convert said signals into digital sound data. The sound detection device may further be effective to generate one or more digital data files based upon the received sound signals, predefined parameters, or other variable inputs, such that the digital data files comprise the digital sound data, the type of electromechanical device 12 to which the sound detection device 14 is operatively connected, and the location of the electromechanical device 12 or sound detection device 14.

The term "electromechanical device" as used herein is not limited in scope with respect to a particular field of use, but generally refers within the scope of the present invention to electrical or electro-mechanical devices, components, or systems that generate or emit sound energy representative of flaw, excessive wear, and/or failure (e.g., creating measurable changes in air pressure based on changes in work intensity), and may typically include, without limitation, transformers, switching power converters, air compressors, boilers, chillers, air condensing units, cooling towers, pumps, motors, fans, piston compressors, reciprocal compressors, and the like.

In certain embodiments, one or more of the sound detection device 14 and transducer 16 may be installed as original-equipment-manufactured components of the electromechanical device 12. In alternative embodiments, the sound detection device 14 and transducer 16 may comprise a functional sound detection module 18 installable as an aftermarket component in or relative to the electromechanical device 12. In said embodiments, the type of electromechanical device 12 and location of the electromechanical device 12 or sound detection device 14 may be predefined in accordance with the installation of the component or module 18.

In a preferred embodiment, the transducer 16 in accordance with a sound detection module 18 may be mounted with respect to the electromechanical device 12 at a 0° angle of reference such that the transducer receives sound waves perpendicular to the surface of the electromechanical device 12. The transducer 16 may further be isolated from physical vibrations and other relevant effects generated by the electromechanical device 12 via a shroud formed of a material such as elastic, situated between the electromechanical device 12 and the transducer 16. The shroud may preferably have high form retention characteristics and effective to return the transducer 16 to the preferred 0° angle of reference upon dislocation by, e.g., physical vibration. In certain embodiments, the transducer 16 may be operatively connected to the sound detection device 14 by means of a sound dampening tube of a length corresponding to a distance between the desired mounting position and the module 18.

In preferred embodiments, due to the extremely low voltage needed to discern the relevant sounds at the most sensitive applicable levels, the module including the shroud and associated material components may desirably be configured to further reduce the peak amplitude of physical vibrations to the transducer 16 from about 1.4 microvolts to 0.3 microvolts, a ~300% vibration dampening effect.

In certain embodiments, the sound detection device 14 may further be able to transmit at least the digital sound data or the digital data files across a communications network 22 to a host server 24. In one embodiment, the sound detection device 14 may transmit digital data files across the Internet by means of a modem to an Internet-connected monitoring server 24. In an alternative embodiment, the sound detection device 14 may transmit digital data files on a local intranet network to a local host server 24. In further embodiments, the local host server may be configured to receive input from a plurality of sound detection devices 14 or other automated monitoring devices and provide a centralized point of feedback for the performance and operation of one or more electromechanical systems.

In certain embodiments, the server 24 (or alternatively, a plurality of functionally and/or communicatively linked servers) may include or otherwise implement a computer-readable medium 26, a processor 30, and a database 32. In execution of a method according to the present invention, the server 24 may be linked to or otherwise access an external database 32b which may be associated with a remote data source in addition to any hosted or otherwise local database or databases 32a residing on or in association with the server(s) 24.

The term "computer-readable medium" as used herein may refer to any non-transitory memory or storage medium or as one of a plurality of non-transitory memory or storage media within which is embodied a computer program product 28 that includes processor-executable software, instructions, program modules, etc., 28a-28e, which upon execution may provide data or otherwise cause a computer system to implement subject matter or otherwise operate in a specific manner as further defined herein. It may further be understood that more than one type of computer readable medium may be used in combination to conduct processor-executable software, instructions, program modules, etc., from a first medium upon which the software, instructions, program modules, etc., initially reside to a processor for execution.

In certain embodiments, the processor 28 may execute software instructions 28 stored on the computer-readable medium 26 effective to receive the digital data files via the network 22 and store said digital data files in the database 32. The processor 28 may further execute software instructions 28 stored on the computer-readable medium 26 effective to determine one or more models of baseline data in association with the digital data files and compare the baseline data to the digital data files for purposes of determining a status of operation. The processor 28 may still further execute software instructions 28 stored on the computer-readable medium 26 effective to identify variations between the digital sound data stored in the database 32 and the selected comparative baseline data and associate said variations with one or more types of failure or substandard operation of the electromechanical device 12.

In further embodiments, the processor 28 may execute software instructions 28 stored on the computer-readable medium 26 effective to create, adjust, or modify baseline data in association with one or more modes of operation and store the modified baseline data in the database 32. In an exemplary embodiment, the processor 28 may execute software instructions 28 effective to determine model baseline data in accordance with digital sound files associated with one or more types of electromechanical devices such that, for a plurality of electromechanical devices 12 one or more modes of operation are determined. In a further exemplary embodiment, the software instructions 28 may be effective to determine model sound data associated with the suboptimal performance or failure of one or more components in the electromechanical device 12 in accordance with a plurality of digital sound files received over a period of time, such that received sound data files of a certain type may be compared against various models to predict the rate of degradation of the electromechanical device 12 or its constituent components.

In certain embodiments, the processor 30 may execute software instructions 28 effective to generate an alert when comparisons indicate a certain mode of operation. The alert may indicate failure, substandard operation, potential failure conditions, and other suboptimal operational modes. In further embodiments, the alert may comprise a diagnostic warning and one or more proposed solutions for curing the suboptimal operational mode.

In certain embodiments, the processor 30 may send an alert across the communications network 22 to an endpoint device 32 associated with a monitoring user. An endpoint device processor 34 may be effective to receive the alert from the communications network 22 and display the alert within a user interface generated on a display device 36 associated with the endpoint device 32. Certain embodiments of the endpoint device 32 may include, for example, a personal computer, a smart phone, a tablet computer, a specialized diagnostic device, a control module for the electromechanical device, and the like.

In further certain embodiments, the personal mobile computing device may execute computer program instructions upon user initiation to generate a user interface including dashboards and associated program tools for purposes of displaying the generated alert. In another embodiment, the display device 32 may be associated with the server 24 in configuration as a control device, monitoring device, or host device for a plurality of sound detection devices 14.

The term "user interface" as used herein may, unless otherwise stated, include any input-output module by which a user device facilitates user interaction with respect to at least the hosted server including, but not limited to, web browsers; web portals, such as individual web pages or those collectively defining a hosted website; telephony interfaces such as interactive voice response (IVR); and the like. Such interfaces may in a broader sense include pop-ups or links to third party websites for the purpose of further accessing and/or integrating associated materials, data, or program functions via the hosted system and in accordance with methods of the present invention. A user interface may further be described with respect to a sound detection device or personal mobile computing device in the context of buttons and display portions which may be independently arranged or otherwise interrelated with respect to, for example, a touch screen, and may further include audio and/or visual input/output functionality even without explicit user interactivity.

In certain embodiments, the device may transform the digital sound data via filtration, reduction, or amplification algorithms effective to improve the comparison of the digital sound data with the baseline data. The device may further or alternatively convert the filtered and amplified digital impulses back to analog signals for user examination of the represented sound data via an acoustical playback device in association with the endpoint device such as, for example, audio speakers.

Figure 2:
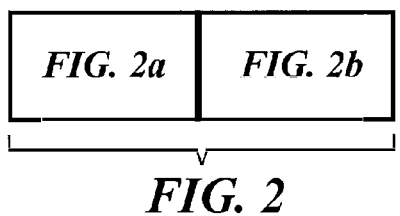
FIGS. 2a and 2b are a flowchart representing an exemplary embodiment of a method for comparative analysis of sound data according to the present disclosure.
Figure 2A:
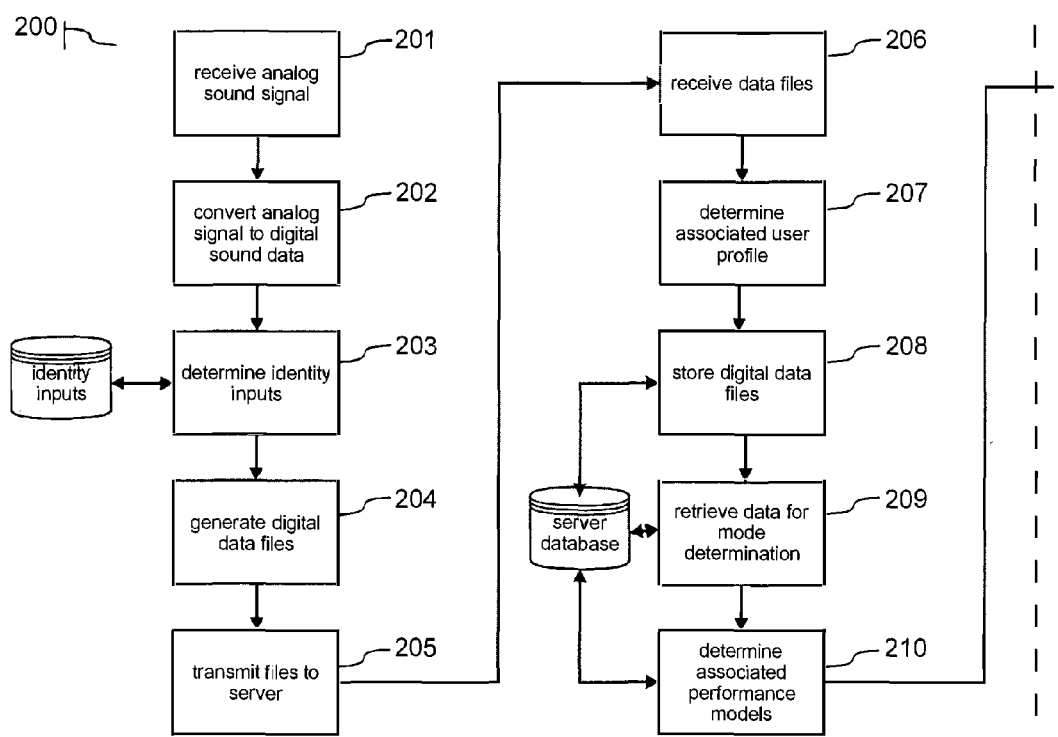
Figure 2B:
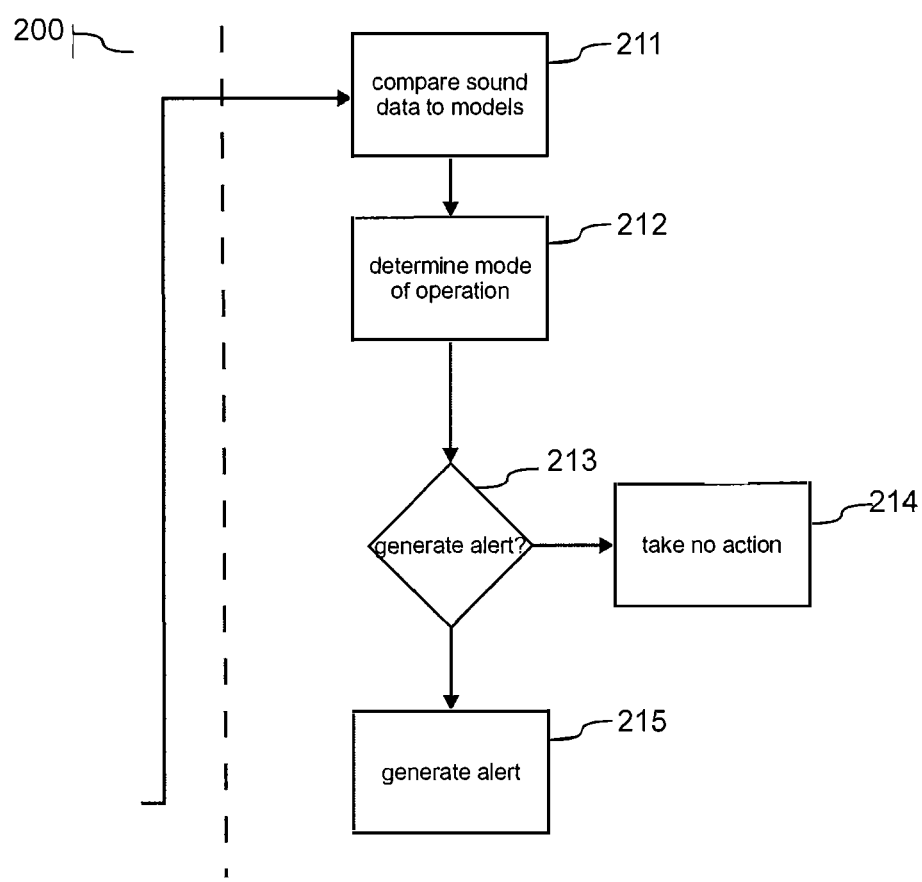

Referring now to FIG. 2, an embodiment of a method for comparative analysis of sound data associated with the operation of an electromechanical device may be described in association with the system represented in FIG. 1.

Steps 201 to 205 refer generally to a method for receiving and transmitting sound data to a server.

The method 200 begins at a first step 201 when a sound detection device receives analog sound signals associated with the operation of an electromechanical device. In step 202, the sound detection device converts the analog sound signal to digital sound data. In certain embodiments, the analog-to-digital conversion may be achieved by means of one or more transducers.

In step 203, the sound detection device determines identity inputs comprising at least location information and electromechanical device type based upon one or more parameters. In certain embodiments, the location information may pertain to the location of the sensor, or in alternative embodiments, the location information may pertain to the location of the electromechanical device. In further embodiments, the electromechanical device type may be determined from a number of predetermined makes and models of electromechanical devices. The identity inputs may be predefined in accordance with the installation of the sound detection device, or alternatively, the sound detection device may determine the identity inputs from signals received via the transducers or via other sensors.

In step 204, the sound detection device associates the digital sound data with the determined identity inputs and generates one or more digital data files comprising the digital sound data and the identity inputs. In step 205, the sound detection device transmits the one or more digital data files to a server across a communications network.

Steps 206 to 212 refer generally to a method for comparing received sound data to model data for purposes of detecting suboptimal electromechanical device performance.

In step 206, the server receives the one or more digital data files from the sound detection device. In certain embodiments, the server may be configured to receive files from a plurality of sound detection devices in association with one or more electromechanical devices. In an embodiment, the server may be employed as an Internet-connected monitoring device for a host user to monitor the ongoing performance of certain electromechanical devices associated with clients across a broad geography. In another embodiment, the server may function as an on-site monitoring device for one or more electromechanical devices within a given geographical location, such as, for example, an office building or industrial complex. The receipt of the files may be performed either periodically or continuously.

Upon receiving the digital data files, the server determines from the identity inputs within the digital data files an associated user profile (207). The user profile may be associated with any number of uniquely identifying traits, such as an electromechanical device SKU, a model number, a client name and device ID, a geographic location, and the like. The server then stores the received digital data files in one or more databases in association with the user profile (208).

In step 209, the server retrieves the digital sound data associated with a user profile for purposes of determining one or more modes of operation for an electromechanical device. In certain embodiments, the server may retrieve a plurality of digital sound data, such as, for example, the sound data received from all sound detection devices installed in an electromechanical device, or a period of historical sound data generated by a single sound detection device.

The server then determines one or more associated performance models against which to compare the digital sound data of the retrieved sound files (210). In certain embodiments, the performance models may be preconfigured in association with operative modes of performance for a particular electromechanical device. For example, the server may be configured to retrieve models associated with various modes of general performance for an electromechanical device of a certain type, make, or model. In further embodiments, the server may be configured to retrieve models associated with the failure or suboptimal performance of specific components within the electromechanical device. In still further embodiments, the server may generate performance models from analysis of historical trend data determined from the electromechanical device or a plurality of devices of similar type, make, or model.

In step 211, the server compares the retrieved digital sound data with the determined performance models. In certain embodiments, the server may optionally perform certain transformations to the digital sound data to effect a better comparison, such as, for example, reducing noise, applying filters, removing data point outliers, amplifying the signal, and the like. In an embodiment, the server may compare the digital sound data to a series of performance models to find matched similarities indicating mode of operation. In an alternative embodiment, the server may compare the digital sound data to one or more performance models to determine identifiable differences indicating a mode of operation. From the comparison, the system determines a mode of operation for the electromechanical device (212).

Steps 213 to 215 refer generally to a method for generating an alert effective to notify a user of suboptimal operation of the electromechanical device.

On determination of a mode of operation in accordance with step 212, the server then determines from the diagnosed mode of operation whether an alert should be generated (213). In certain embodiments, certain modes of operation may be pre-associated with alert generation. For example, certain modes of operation associated with the failure of certain components within the electromechanical device may be associated with alert statuses. In alternative embodiments, the server may determine whether to generate an alert based upon one or more predictive analysis models, such as predicting the failure of a device component from a history of sound data.

If the server determines that no alert should be generated, the system returns to its default monitoring state without taking further action (214). Alternatively, if the server determines that an alert should be generated, it instead proceeds to step 215 and generates an alert to notify an end-user as to the status of the electromechanical device. In preferred embodiments, the server may include with the alert diagnostic information and/or proposed corrective actions. In certain embodiments, the server may send the alert across the to an end-point device associated with the end-user. In one or more steps not depicted, the endpoint device may generate a user interface and, upon receipt of the alert from the server, populate the user interface with the alert and respective alert information. In further optional steps, the server may determine whether corrective action has been performed by, for example, receiving notification from the user that corrective action has been performed. In an alternative example, the server may determine whether corrective action has been performed when received sound data indicates optimal performance has resumed. In still another example, the server may receive notification from specially configured sound detection devices effective to forward repair log data that an authorized repair has been performed.

Figure 3:
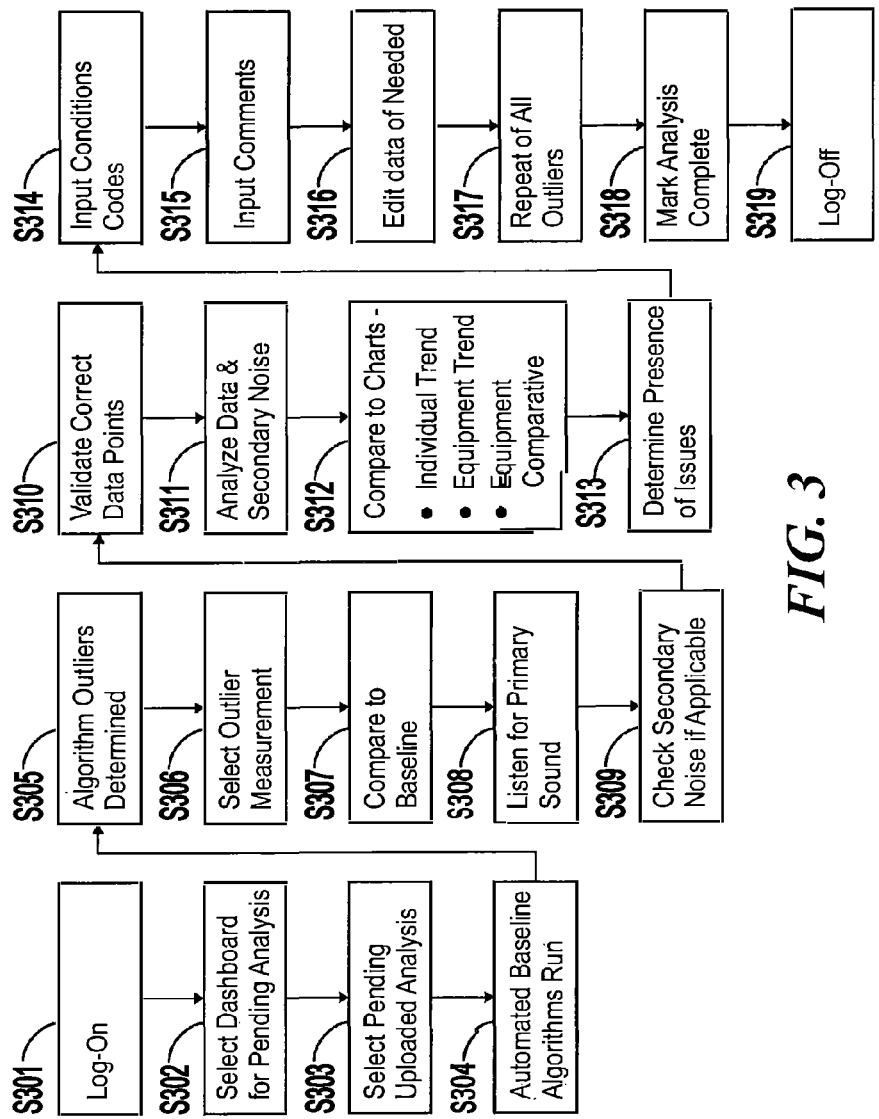
FIG. 3 is a flowchart representing an exemplary data analysis process in accordance with embodiments of the present disclosure.

Referring now to FIG. 3, an exemplary process may be described whereby a technician associated with a program partner (or for example a technician or administrator associated with the host) in accordance with systems, methods and algorithms as disclosed herein may perform analysis the surveyed sound files with respect to a particular customer, property or electromechanical device, and in various embodiments further with respect to historical and aggregated data with respect to a number of customers, properties and electromechanical devices.

The technician begins by logging in to a user interface (e.g., website) generated by or in association with the host program (S301) which enables selection of a dashboard configured for pending analysis (S302), and further enables the selection of any one of a number of pending analyses (S303). The technician may implement program tools and back-end algorithms to for example identify or determine baseline data associated with the electromechanical device, and/or inspection point (S304), and further to identify or determine any outliers in the sound data with respect to the data itself or historical data associated therewith, and irrespective of the baseline (S305).

Program tools further may enable the technician to select a particular outlier measurement (S306) and perform a comparative analysis with respect to the identified or determined baseline (S307).

Program tools further may enable the technician to select sound files associated with the selected analysis and listen for primary sound (S308), check for the presence and/or effect of secondary noise where applicable (S309), and validate that the associated data points are correct (S310).

Comparative analysis tools may be provided by the system to enable the technician to analyze the sound data and secondary noise (S311) by way of direct review and analysis of the individual data points or by way of visual comparison via charts, graphs, etc., representing an individual trend, electromechanical device trend, device comparisons with respect to historical or aggregated data for related electromechanical devices stored in the system, etc. (S312). Using any or all of the above tools, or others as may be known in the art and further provided within the scope of the present invention, the technician may determine the presence of issues with respect to the electromechanical device in question (S313) and input condition codes (S314) and/or comments (S315) in association with the equipment. Such input may be in the form of line items in an equipment profile as may be displayed upon later request with respect to that piece of equipment, or as may take the form of tags or an equivalent that may be searchable by a user with respect to such conditions or comments generally. The technician may edit data as needed or desired (S316).

The process steps S306-S316 may then be repeated (S317) for all outliers having been determined by the system algorithms in step S305, and the technician may subsequently or otherwise mark the analysis as complete (S318). The process steps S303-S318 may likewise be repeated for all uploaded analyses as may be pending. The technician may otherwise log off from the user interface/website/program (S319).

Figure 4:
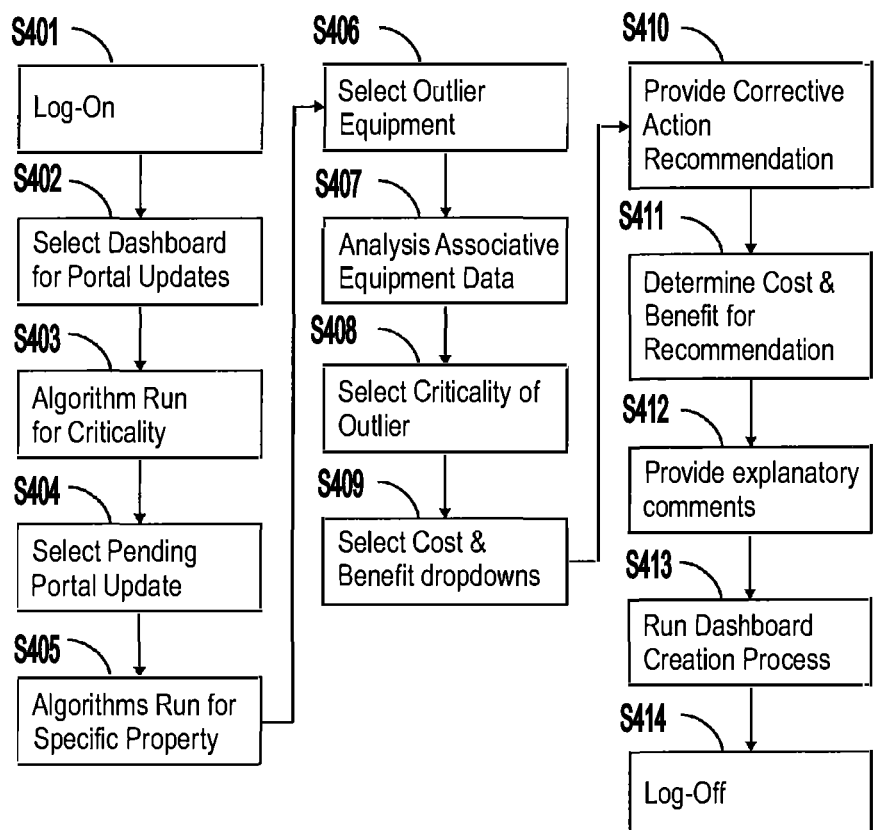
FIG. 4 is a flowchart representing an exemplary user interface process for analyzing critical data and providing recommendations in accordance with embodiments of the present disclosure.

Referring now to FIG. 4, an exemplary process may be described whereby an entity such as a program partner in accordance with the present invention may identify critical data based on results from one or more of the above-referenced processes, and perform cost-benefit analyses with respect to maintenance or potential corrective actions.

The technician begins by logging in to a user interface (e.g., website) generated by or in association with the host program (S401) which enables selection of a dashboard configured for portal updates (S402). The technician may implement program tools and back-end algorithms to generate system updates with respect to equipment and/or inspection points and further assess the criticality of results from the previous analyses (S403). Program tools enable the technician to select one from a list of pending portal updates (S404), and execute algorithms to identify and assess critical data points with respect to a specific associated property (S405). The program tools further enable the technician to select outlier equipment with respect to the property, or alternatively from a searchable list of equipment with respect to other key parameters or criteria (S406), and execute algorithms to analyze the associated equipment data (S407).

The technician may be enabled by the system to select, determine or define a criticality of the selected outlier equipment (S408). The dashboard may in various embodiments include a cost-benefit dropdown menu, hyperlinks, or some equivalent that is selectable by the user (S409). The technician may provide a corrective action recommendation (S410), and determine the costs and benefits for the provided recommendation by executing appropriate algorithms from the system (S411). As needed or desired, the technician may provide explanatory comments with respect to the provided recommendation and associated cost-benefit analysis (S412), and execute a dashboard creation process that may for example assemble or modify the customer dashboard based on the results generated in this and previously recited processes of the present invention (S413).

Figure 5:
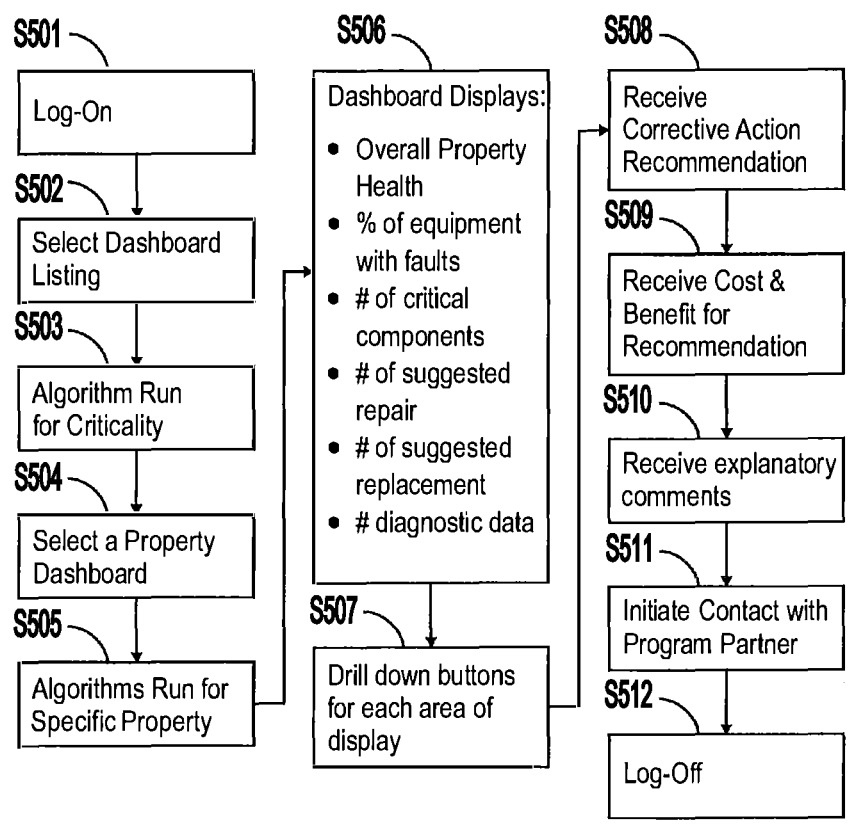
FIG. 5 is a flowchart representing an exemplary user interface process for receiving, reviewing and filtering results in accordance with embodiments of the present disclosure.

Referring now to FIG. 5, an exemplary process may be described whereby an entity such as a customer in accordance with the present invention may review results generated by the algorithms and program tools.

The customer begins by logging in to a user interface (e.g., website) generated by or in association with the host program (S501) which enables selection of any one of a number of available dashboards for that customer (S502). The customer may implement program tools and back-end algorithms to generate any critical system updates (S503). Program tools enable the customers to select one from a list of properties (S504), and execute algorithms to generate results for that property and accordingly populate a template for that dashboard with the appropriate results data (S505). Exemplary dashboard displays may include without limitation an overall property health value (which may be for example an assigned value such as "good" or may be a continuous variable as generated using appropriate algorithms and underlying component values); a percentage of equipment with faults; a current number of critical components; a current number of suggested repairs; a current number of suggested replacements; historical values for any of the above; any fixed diagnostic data values and/or diagnostic data variables as may be determined from any of the above (S506).

In various embodiments, the dashboard may be configured to include drill down buttons for each area of display (S507) such that the system may simply expand and display previously hidden data, or may alternatively further provide decision support capabilities such as for example online analytical processing (OLAP) such that the above-referenced values and variables may be analyzed with respect to a number of dimensions (e.g., time, location, technician).

The customer may be enabled by the system to receive (directly or by user selection) a corrective action recommendation as previously provided from a technician (S508), and to review an associated cost-benefit analysis for that recommendation (S509) and any explanatory comments from the technician (S510). If for example the customer elects to conduct further maintenance or other preventative action, the customer may be enabled by the system to directly initiate contact with the program partner or the host itself (S511), or alternatively to simply log off from the system (S512).

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "communications network" as used herein with respect to data communication or exchange between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISPs), and intermediate communication interfaces.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for comparative analysis of sound data associated with the operation of an electromechanical device, the system comprising:
   at least one sound detection device embedded in a module mounted to the electromechanical device, wherein the module is configured to position one or more transducers transversely with respect to a surface of the electromechanical device, and wherein the transducers are configured to continuously collect analog sound signals from the electromechanical device and convert the collected sound signals into digital sound data,
   wherein the sound detection device further comprises an elastic shrouding material situated between the one or more transducers and the electromechanical device, the shrouding material effective to isolate the one or more transducers from physical vibration;
   wherein the sound detection device is further configured to generate one or more digital sound data files and to transmit each of said data files, location data, and electromechanical device type data via a communications network; and
   a server comprising a processor operatively linked to the communications network and configured to
      receive the digital data files from the sound detection device and store the received data files in data storage associated with the server,
      determine baseline criteria according to one or more of the electromechanical device type, location, and sound data, wherein one or more comparative models of baseline data are associated with at least one status of operation of the electromechanical device,
      compare the received digital sound data with the baseline data,
      identify variations between the collected digital sound data and the baseline data associated with failure or substandard operation of the electromechanical device, and
      generate an alert effective to notify a user of the failure or substandard operation of the electromechanical device.

2. The system of claim 1, wherein the shrouding material is further effective to return the one or more transducers to a zero-degree point of reference from the mounting position of the sound detection device by means of elastic retention.

3. The system of claim 2, wherein the shrouding material dampens physical vibration to the one or more transducers to peak amplitude of 0.3 microvolts or less.

4. The system of claim 1, wherein the baseline data is preconfigured in accordance with the electromechanical device type.

5. The system of claim 1, wherein the sound detection device is further configured to collect environmental condition data comprising ambient pressure and temperature information and to transmit said environmental condition data to the server via the communications network.

6. The system of claim 5, wherein the processor is further configured to identify an expected point of failure for the electromechanical device, said identification based on one or more of operative performance, threshold violations, trend patterns, and environmental conditions associated with the electromechanical device over a period of time.

7. The system of claim 6, the processor further configured to aggregate the digital data files from a plurality of sound detection devices in accordance with the baseline criteria.

8. The system of claim 7, the processor further configured to determine cost-benefit data from one or more of operative performance, repair cost, threshold violations, trend patterns, and environmental conditions associated with one or more electromechanical devices over a period of time.

9. The system of claim 8, the processor further configured to calculate a cost-benefit analysis from the cost-benefit data in relation to the expected cost of maintenance and repair for the electromechanical device over a period of time.

10. The system of claim 1, the processor further configured to generate a user interface effective to enable authorized users to monitor an operative status of the electromechanical device as determined by the comparison of the digital sound data to the baseline data.

11. The system of claim 1, wherein generating an alert effective to notify a user of the failure or substandard operation of the electromechanical device further comprises transmitting the alert via the communications network to an endpoint device associated with an authorized user.

12. A method for comparative analysis of sound data associated with the operation of an electromechanical device, the method comprising:
   resiliently mounting one or more transducers to the electromechanical device, wherein the transducers continuously receive analog sound signals perpendicular to a surface of the electromechanical device over time;
   converting the collected sound signals into digital sound data;

transmitting one or more data files comprising said digital sound data, location data and electromechanical device type data to a server via a communications network;

storing the received data files in a database in association with a profile associated with the electromechanical device, determining baseline criteria according to one or more of the electromechanical device type, location, and sound data, one or more comparative models of baseline data associated with at least one status of operation of the electromechanical device, aggregating the digital data files from a plurality of sound detection devices in accordance with the baseline criteria;

comparing the received digital sound data with the baseline data, determining cost-benefit data from one or more of operative performance, repair cost, threshold violations, trend patterns, and environmental conditions associated with one or more electromechanical devices over a period of time;

calculating a cost-benefit analysis from the cost-benefit data in relation to the expected cost of maintenance and repair for the electromechanical device over a period of time;

identifying variations between the collected digital sound data and the baseline data associated with failure or substandard operation of the electromechanical device, and generating an alert effective to notify a user of the failure or substandard operation of the electromechanical device.

13. The method of claim 12, further comprising identifying an expected point of failure for the electromechanical device, said identification based on one or more of operative performance, threshold violations, trend patterns, and environmental conditions associated with the electromechanical device over a period of time.

14. The method of claim 12, further comprising generating a user interface effective to enable authorized users to monitor the operative status of the electromechanical device as determined by the comparison of the digital sound data to the baseline data.

15. The method of claim 12, further comprising transmitting the alert via the communications network to an endpoint device associated with an authorized user.

16. A system for comparative analysis of sound data associated with the operation of an electromechanical device, the system comprising:

a sound detection device mounted with respect to the electromechanical device and comprising one or more transducers configured to continuously collect analog sound signals from the electromechanical device and convert the collected sound signals into digital sound data, a shrouding material situated between the one or more transducers and the electromechanical device, the shrouding material configured to dampen physical vibration to the one or more transducers to a peak amplitude of 0.3 microvolts or less, wherein the shrouding material is further configured to return the one or more transducers to a zero-degree point of reference from a mounting position of the sound detection device by means of elastic retention, wherein the sound detection device is further configured to generate one or more digital sound data files and to transmit each of said data files, location data, and electromechanical device type data via a communications network; and a computing device comprising a non-transitory computer readable medium having program instructions residing thereon, the instructions executable by a processor operatively linked to the communications network to direct the performance of operations comprising receiving the digital data files from the sound detection device and storing the received data files in a data storage, determining baseline criteria according to one or more of the electromechanical device type, location, and sound data, wherein one or more comparative models of baseline data are associated with at least one status of operation of the electromechanical device, comparing the received digital sound data with the baseline data, identifying variations between the collected digital sound data and the baseline data associated with failure or substandard operation of the electromechanical device, and generating an alert effective to notify a user of the failure or substandard operation of the electromechanical device.

17. The system of claim 16, wherein the baseline data is preconfigured in accordance with the electromechanical device type.

18. The system of claim 16, wherein the processor is further configured to identify an expected point of failure for the electromechanical device, said identification based on one or more of operative performance, threshold violations, trend patterns, and environmental conditions associated with the electromechanical device over a period of time.

19. The system of claim 16, the processor further configured to aggregate the digital data files from a plurality of sound detection devices in accordance with the baseline criteria.

20. The system of claim 19, the processor further configured to determine cost-benefit data from one or more of operative performance, repair cost, threshold violations, trend patterns, and environmental conditions associated with one or more electromechanical devices over a period of time, and calculate a cost-benefit analysis from the cost-benefit data in relation to the expected cost of maintenance and repair for the electromechanical device over a period of time.

* * * * *